US011813748B2

(12) United States Patent
Bennice et al.

(10) Patent No.: US 11,813,748 B2
(45) Date of Patent: Nov. 14, 2023

(54) SIMULATING MULTIPLE ROBOTS IN VIRTUAL ENVIRONMENTS

(71) Applicant: GOOGLE LLC, Mountain View, CA (US)

(72) Inventors: Matthew Bennice, San Jose, CA (US); Paul Bechard, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 314 days.

(21) Appl. No.: 17/069,684

(22) Filed: Oct. 13, 2020

(65) Prior Publication Data

US 2022/0111517 A1 Apr. 14, 2022

(51) Int. Cl.
*B25J 9/16* (2006.01)
*B25J 9/00* (2006.01)

(52) U.S. Cl.
CPC .......... *B25J 9/1605* (2013.01); *B25J 9/0084* (2013.01)

(58) Field of Classification Search
None
See application file for complete search history.

(56) References Cited

U.S. PATENT DOCUMENTS 9,811,074 B1 11/2017 Aichele et al.
10,792,810 B1 10/2020 Beckman et al.
2016/0031082 A1* 2/2016 Hazan ................ B25J 9/1664 700/250
2019/0344441 A1* 11/2019 Rottmann ............. B25J 9/1633
2020/0122321 A1 4/2020 Khansari Zadeh et al.
(Continued)

FOREIGN PATENT DOCUMENTS

EP 0923011 6/1999
WO WO-2015134391 A1 * 9/2015 ............ B25J 9/1689
WO 2020071174 4/2020

OTHER PUBLICATIONS

Adit Joshi, A Novel Approach for Validating Adaptive Cruise Control (ACC) Using Two Hardware-in-the-Loop (HIL) Simulation Benches, Apr. 2, 2019 (Year: 2019).*
(Continued)

*Primary Examiner* — Jeff A Burke
*Assistant Examiner* — Arslan Azhar
(74) *Attorney, Agent, or Firm* — Gray Ice Higdon

(57) ABSTRACT

Implementations are provided for operably coupling multiple robot controllers to a single virtual environment, e.g., to generate training examples for training machine learning model(s). In various implementations, a virtual environment may be simulated that includes an interactive object and a plurality of robot avatars that are controlled independently and contemporaneously by a corresponding plurality of robot controllers that are external from the virtual environment. Sensor data generated from a perspective of each robot avatar of the plurality of robot avatars may be provided to a corresponding robot controller. Joint commands that cause actuation of one or more joints of each robot avatar may be received from the corresponding robot controller. Joint(s) of each robot avatar may be actuated pursuant to corresponding joint commands. The actuating may cause two or more of the robot avatars to act upon the interactive object in the virtual environment.

12 Claims, 6 Drawing Sheets

(56) References Cited

U.S. PATENT DOCUMENTS

2020/0276708 A1* 9/2020 Shah ................. B25J 5/007
2021/0023703 A1* 1/2021 Ma ................... B25J 9/1671

OTHER PUBLICATIONS

Kuffner, James J. Jr .; Autonomous Agents for Real-Time Animation; Dissertaion for Doctor of Philosophy; Stanford University; 180 pages; dated Dec. 1999.
Amazon Web Services, Inc.; Overview of Amazon Web Services; 95 pages; dated Jan. 2020.
Kapur, Pulkit; Introduction to Automatic Testing of Robotics Applications; AWS Robotics Blog; pp. 1-6; dated Jul. 1, 2020.
Brunner, B. et a.; Task Directed Programming of Sensor Based Robots; German Aerospace Research Establishment; 8 pages; dated 1995.
Kuffner, James J. Jr. et al.; Graphical Simulation and High-Level Control of Humanoid Robots; Department of Mechano-Informatics; IEEE; 6 pages; dated 2020.
Balakirsky, S. et al.; From Simulation to Real Robots with Predictable Results: Methods and Examples; Springer; 27 pages; dated 2009.
Tarnoff, N. et al.; Graphical Sinulation for Sensor Based Robot Programming; Journal of Intelligent and Robotic Systems; 14 pages; dated 1992.
Tully, Foote; tf: The Transform Library; IEEE; 6 pages; dated 2013.
European Patent Office; International Search Report and Written Opinion of Application No. PCT/US2021/054369; 15 pages; dated Jan. 26, 2022.

* cited by examiner

SIMULATING MULTIPLE ROBOTS IN VIRTUAL ENVIRONMENTS

BACKGROUND

Robots are often equipped with various types of machine learning models that are trained to perform various tasks and/or to enable the robots to engage with dynamic environments. These models are sometimes trained by causing real-world physical robots to repeatedly perform tasks, with outcomes of the repeated tasks being used as training examples to tune the models. However, extremely large numbers of repetitions may be required in order to sufficiently train a machine learning model to perform tasks in a satisfactory manner.

The time and costs associated with training models through real-world operation of physical robots may be reduced and/or avoided by simulating robot operation in simulated (or "virtual") environments. For example, a three-dimensional virtual environment may be simulated with various objects to be acted upon by a robot. The robot itself may also be simulated in the virtual environment, and the simulated robot may be operated to perform various tasks on the simulated objects. The machine learning model(s) can be trained based on outcomes of these simulated tasks. In some cases, simulation is good enough to train or at least partially train robot machine models in an expedited and/or inexpensive manner, e.g., so that the model(s) can then be further trained, or "polished," using a limited number of real-world robot operations.

SUMMARY

Different types of robots having different capabilities, constraints, hardware, etc., may operate in the same real-world environment. Accordingly, each robot, and more particularly, each robot's machine learning model(s), may need to be trained separately so that the different robots are able to interact with dynamic aspects of the real-world environment, such as other robots, humans, and/or objects that are moved or otherwise altered physically.

Implementations are described herein for operably coupling multiple robot controllers to a single simulated environment, e.g., for purposes such as generating training examples for use in training machine learning models. These multiple robot controllers may be operated independently from each other to generate and control a corresponding plurality of robot avatars in the simulated environment. The multiple robot avatars may be controlled, via the external robot controllers, to perform various tasks within the virtual environment, such as interacting with virtual objects in the virtual environment. The outcomes of these interactions and performances within the virtual environment may be used, for instance, as training data to train one or more machine learning models.

A robot controller that is coupled to the virtual environment may take various forms. In some implementations, the robot controller may be hardware that is integral with and/or removably extracted from an actual physical robot. For example, the robot controller may include a "brain" that receives sensor data from one or more sensors, processes the sensor data (e.g., using one or more "perception" machine learning models), and based on the processing of the sensor data, provides joint commands to one or more joints (or "actuators") to cause those joints to actuate. The "brain" may take the form of one or more processors, an application-specific integrated circuits (ASIC), a field-programmable gate array ("FPGA") etc., and may or may not include other components, such as memory for buffer(s), busses for connecting sensors/joints, etc.

In other implementations, the robot controller may be a computing device that is configured (e.g., programmed) to simulate the hardware of a real-world robot controller as closely as possible. For example, a robot's constituent components may be simulated in the virtual environment at frequencies that correspond to real-world frequencies at which those components operate. If a real-world vision sensor installed on a robot captures images at 100 MHz, then a vision sensor that also captures images (or in the simulated environment, is provided with simulated images) at 100 MHz may be simulated in the virtual environment. The programmed computing device may provide, as outputs, joint commands at the same frequency as real-world control commands that the robot being simulated would send to its real-world joints.

The multiple robot controllers may be operably coupled with the virtual environment in various ways. In some implementations, the virtual environment may be simulated by one or more servers forming part of what is often referred to as a "cloud" infrastructure, or simply "the cloud." For example, a commercial entity may simulate a virtual environment, and may allow its "clients" to couple their robot controllers to the virtual environment, e.g., using an application programming interface (API). The clients may then train their robots' machine learning models virtually, without the clients needing to create their own simulated environments. In many cases the robot controllers may not be physically co-located with these server(s), and therefore may be coupled with the server(s) over one or more local and/or wide area networks using various wired and/or wireless communication technologies.

In various implementations, each of the plurality of external robot controllers that are coupled to the virtual environment may be provided with sensor data that is generated from a perspective of the robot avatar in the virtual environment that is controlled by the robot controller. Similarly, each robot controller may provide joint commands that cause actuation of one or more joints of the respective robot avatar in the virtual environment that is controlled by the robot controller. One or more joints of each robot avatar may be actuated pursuant to these corresponding joint commands. In some implementations, a result of this actuating may be that two or more of the robot avatars act upon a single interactive object in the virtual environment.

In some implementations in which it is desired that robots cooperate with each other, the robots' avatars may cooperate in the virtual environment to interact with the same interactive object. For example, one robot avatar may lift the interactive object so that the other robot avatar may act upon a portion of the interactive object that was inaccessible previously.

As alluded to above, different robots may operate at different frequencies. More particularly, different components of different robots may operate at different frequencies. Additionally, in the real world, there likely will be instances where a robot deviates from its frequency and/or "lags," e.g., is temporarily frozen or its operation is delayed. Similarly, in virtual environments such as those described herein to which robot controllers are coupled over one or more networks, it is possible that elements external to the robot controller and/or virtual environment, such as network latency/traffic, may cause a robot avatar to deviate from its expected frequency in a manner that cannot be easily recreated. However, for training purposes it may be desirable that iterations of robotic tasks be capable of being recreated in a deterministic fashion.

Accordingly, in some implementations, a "simulated world clock" of the virtual environment may be selectively (and temporally) advanced or paused in order to account for deviations of individual avatars from their expected operational frequencies. In some implementations, the simulated world clock may be operated at a frequency that is greater than or equal to the highest frequency achievable by any of the robot controllers. The plurality of robot avatars in the virtual environment may be operated at frequencies that correspond to real-world frequencies of the respective robot controllers that control the plurality of robot avatars.

Suppose the highest frequency robot avatar operates at 200 MHz and a lower frequency robot avatar operates at 20 MHz. The frequency of the simulated world clock may be set to 200 MHz, so that every iteration of the simulated world clock corresponds with one atomic operation by the highest frequency robot. Meanwhile, the lower frequency robot avatar will perform an atomic operation one tenth as frequently as the simulated world frequency, or once every ten cycles of the simulated world clock. Put another way, for every ten cycles of the simulated world clock, the highest frequency robot performs ten atomic operations and the lower frequency robot performs one operation.

When a particular robot avatar lags for some reason (which likely will not be easily recreated), that robot avatar may not be ready to perform its respective operation in synch with the simulated world clock. Accordingly, to ensure that actions by robot avatars can be recreated deterministically, the simulated world clock may be paused until the lagged robot avatar is able to "catch up." Picking up the example described previously, suppose the lower frequency (20 MHz) robot avatar lags by three clock cycles, e.g., due to a network connection between its external robot controller and the server(s) operating the virtual environment becoming temporarily overwhelmed with network traffic. The simulated world clock may be paused until the lagged robot avatar is able to perform its operation. Once the lagged robot avatar performs its operation, the simulated world clock may resume, which will allow the other robot avatars to also resume operation.

In some implementations, a directed acyclic graph (also referred to as a "robot device graph") may be generated to represent sensors and/or other constituent components of a robot in the virtual environment. Each graph may include nodes that represent components of a robot simulated by and/or for the benefit of a robot avatar, including but not limited to the robot's sensors, joints, etc. In some such implementations, the directed acyclic graph may be a dependency graph in which edges between nodes represent dependencies between the components represented by the nodes.

For instance, a child node may represent a vision sensor that feeds visual data it captures to a parent node, which may represent a processor or a module that applies a machine learning model to vision data captured at the vision sensor to generate additional output (e.g., an object recognition and/or pose prediction). This output may be passed further up the graph until a root node representing a final processing unit is reached. This processing unit may process whatever data it receives from its children nodes and then may generate commands that are propagated down the graph, e.g., to other nodes representing joints of the robot.

In some implementations, each node of the acyclic graph may include information about the operational capabilities and/or constraints of the node's corresponding robot component. For example, a node representing a vision sensor may specify, for instance, a resolution of the vision sensor, a frequency at which the vision sensor captures vision data, etc. If one or more components represented by one or more nodes above the vision sensor's node operate at higher frequencies than the vision sensor, those nodes may nonetheless wait for some number of cycles of the simulated world clock for the vision sensor node to generate its output, before those higher level nodes perform their own operations based on the vision data. In other words, if the vision sensor is a bottleneck in the robot in the real world, then the acyclic graph may enforce that bottleneck in the virtual world to ensure that the robot's machine learning model(s) are trained based on how the robot actually operates.

Nodes of the acyclic graph are not limited to robot components such as sensors, joints, or processing units. In some implementations, one or more nodes of the directed acyclic graph may represent a simulated environmental condition of the virtual environment. For example, a node adjacent (e.g., above or below) a vision sensor node may be configured to simulate particulates in the virtual environment that are captured in (and add noise to) the vision data captured by the vision sensor. As another example, a node may be configured to impose cross winds on a drone under particular circumstances, such as when the drone is attempting to land. Yet other nodes of the directed acyclic graph may represent a simulated condition of a simulated sensor of the robot avatar, such as a vision sensor that has accumulated a layer of dust from the simulated particulates in the virtual environment.

In some implementations, a computer implemented method may be provided that includes: simulating a three-dimensional environment that includes an interactive object, wherein the simulated environment includes a plurality of robot avatars that are controlled independently and contemporaneously by a corresponding plurality of robot controllers that are external from the simulated environment; providing, to each robot controller of the plurality of robot controllers, sensor data that is generated from a perspective of the respective robot avatar of the plurality of robot avatars that is controlled by the robot controller; receiving, from each robot controller of the plurality of robot controllers, joint commands that cause actuation of one or more joints of the respective robot avatar of the plurality of robot avatars that is controlled by the robot controller; and actuating one or more joints of each robot avatar pursuant to corresponding joint commands, wherein the actuating causes two or more of the plurality of robot avatars to act upon the interactive object in the simulated environment.

In various implementations, a given robot controller of the plurality of robot controllers may be integral with a robot that is operably coupled with the one or more processors. In some such implementations, the sensor data provided to the given robot controller may be injected into a sensor data channel between one or more real-world sensors of the given robot and one or more processors of the robot controller that is integral with the given robot, and/or the joint commands received from the given robot controller may be intercepted from a joint command channel between one or more processors of the robot controller and one or more joints of the given robot.

In various implementations, the method may further include generating, for each robot avatar of the plurality of robot avatars, a directed acyclic graph with nodes that represent components of the robot avatar. In various implementations, the directed acyclic graph is a dependency graph in which edges between nodes represent dependencies between the components represented by the nodes. In various implementations, at least one node representing a simulated sensor of the robot avatar may impose a delay on output of the sensor being passed up the directed acyclic graph, wherein the delay corresponds to a frequency of a real-world sensor corresponding to the simulated sensor. In various implementations, one or more nodes of the directed acyclic graph represent a simulated environmental condition of the simulated environment. In various implementations, one or more nodes of the directed acyclic graph represent a simulated condition of a simulated sensor of the robot avatar.

In various implementations, the actuating may include operating the plurality of robot avatars at frequencies that correspond to real-world frequencies of the respective robot controllers that control the plurality of robot avatars. In various implementations, the method may further include operating a simulated world clock of the simulated environment at a given frequency; and operating a first robot avatar of the plurality of robot avatars at a first frequency that is less than the given frequency. In various implementations, the method may further include pausing a simulated world clock until a robot avatar of the plurality of robot avatars advances to a next stage of operation.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
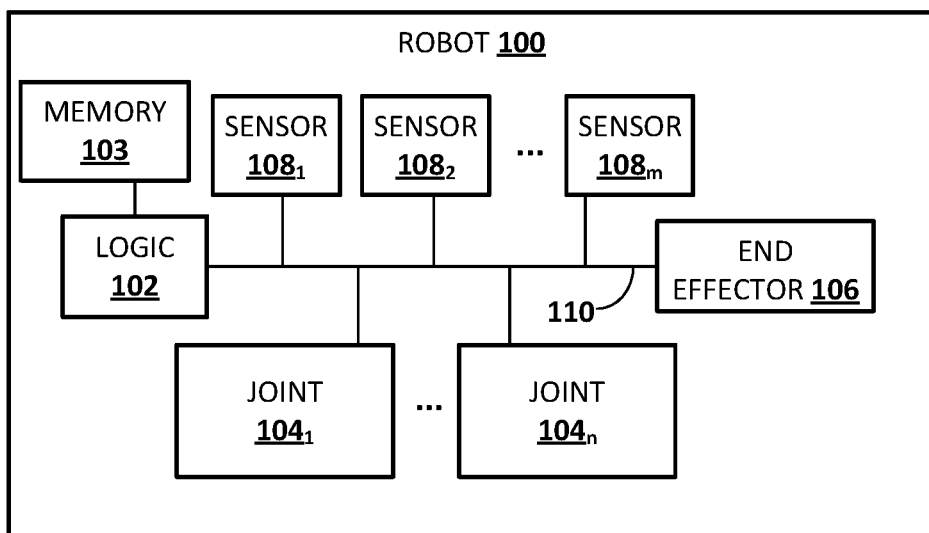
FIG. 1A schematically depicts an example environment in which disclosed techniques may be employed, in accordance with various implementations.

FIG. 1A is a schematic diagram of an example environment in which selected aspects of the present disclosure may be practiced in accordance with various implementations. The various components depicted in FIG. 1A, particularly those components forming a simulation system 130, may be implemented using any combination of hardware and software. In some implementations, simulation system 130 one or more servers forming part of what is often referred to as a "cloud" infrastructure, or simply "the cloud."

Figure 1B:
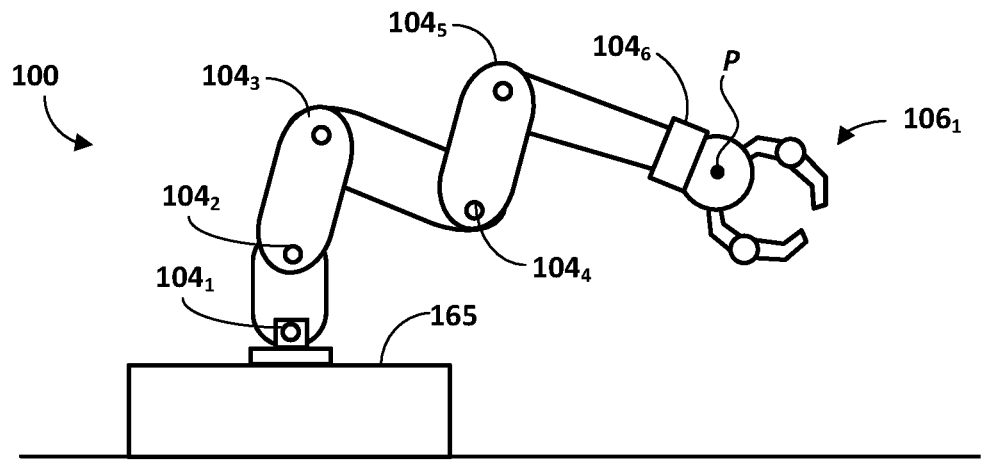
FIG. 1B depicts an example robot, in accordance with various implementations.

A robot 100 may be in communication with simulation system 130. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. One non-limiting example of a robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints $104_{1-n}$, one or more end effectors 106, and/or one or more sensors $108_{1-m}$, e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting.

Simulation system 130 may include one or more computing systems connected by one or more networks (not depicted). An example of such a computing system is depicted schematically in FIG. 6. In various implementations, simulation system 130 may be operated to simulate a virtual environment in which multiple robot avatars (not depicted in FIG. 1, see FIG. 2) are simulated. Each robot avatar may be controlled by a robot controller. As noted previously, a robot controller may include, for instance, logic 102 and memory 103 of robot 100.

Various modules or engines may be implemented as part of simulation system 130 as software, hardware, or any combination of the two. For example, in FIG. 1A, simulation system 130 includes a display interface 132 that is controlled, e.g., by a user interface engine 134, to render a graphical user interface ("GUI") 135. A user may interact with GUI 135 to trigger and/or control aspects of simulation system 130, e.g., to control a simulation engine 136 that simulates the aforementioned virtual environment.

Simulation engine 136 may be configured to perform selected aspects of the present disclosure to simulate a virtual environment in which the aforementioned robot avatars can be operated. For example, simulation engine 136 may be configured to simulate a three-dimensional environment that includes an interactive object. The virtual environment may include a plurality of robot avatars that are controlled independently and contemporaneously by a corresponding plurality of robot controllers (e.g., 102 and 103 of robot 100 in combination) that are external from the virtual environment. Note that the virtual environment need not be rendered visually on a display. In many cases, the virtual environment and the operations of robot avatars within it may be simulated without any visual representation being provided on a display as output.

Simulation engine 136 may be further configured to provide, to each robot controller of the plurality of robot controllers, sensor data that is generated from a perspective of the robot avatar that is controlled by the robot controller. As an example, suppose a particular robot avatar's vision sensor is pointed in a direction of a particular virtual object in the virtual environment. Simulation engine 136 may generate and/or provide, to the robot controller that controls that particular robot avatar, simulated vision sensor data that depicts the particular virtual object as it would appear from the perspective of the particular robot avatar (and more particularly, its vision sensor) in the virtual environment.

Simulation engine 136 may also be configured to receive, from each robot controller, joint commands that cause actuation of one or more joints of the respective robot avatar that is controlled by the robot controller. For example, the external robot controller may process the sensor data received from the simulation engine to make various determinations, such as recognizing an object and/or its pose (perception), planning a path to the object and/or a grasp to be used to interact with the object. The external robot controller may make these determinations and may generate (execution) joint commands for one or more joints of a robot associated with the robot controller.

In the context of the virtual environment simulated by simulation engine 136, these joint commands may be used, e.g., by simulation engine 136, to actuate joint(s) of the robot avatar that is controlled by the external robot controller. Given that there may be multiple robot avatars in the virtual environment at any given moment, in some cases, actuating joints of two or more of the robot avatars may cause the two or more robot avatars to act upon an interactive object in the virtual environment, e.g., one after the other (e.g., one robot avatar moves an object so another robot avatar can clean under it), simultaneously (e.g., one robot avatar lifts a vehicle so another robot avatar can change the vehicle's tire), etc.

Figure 4:
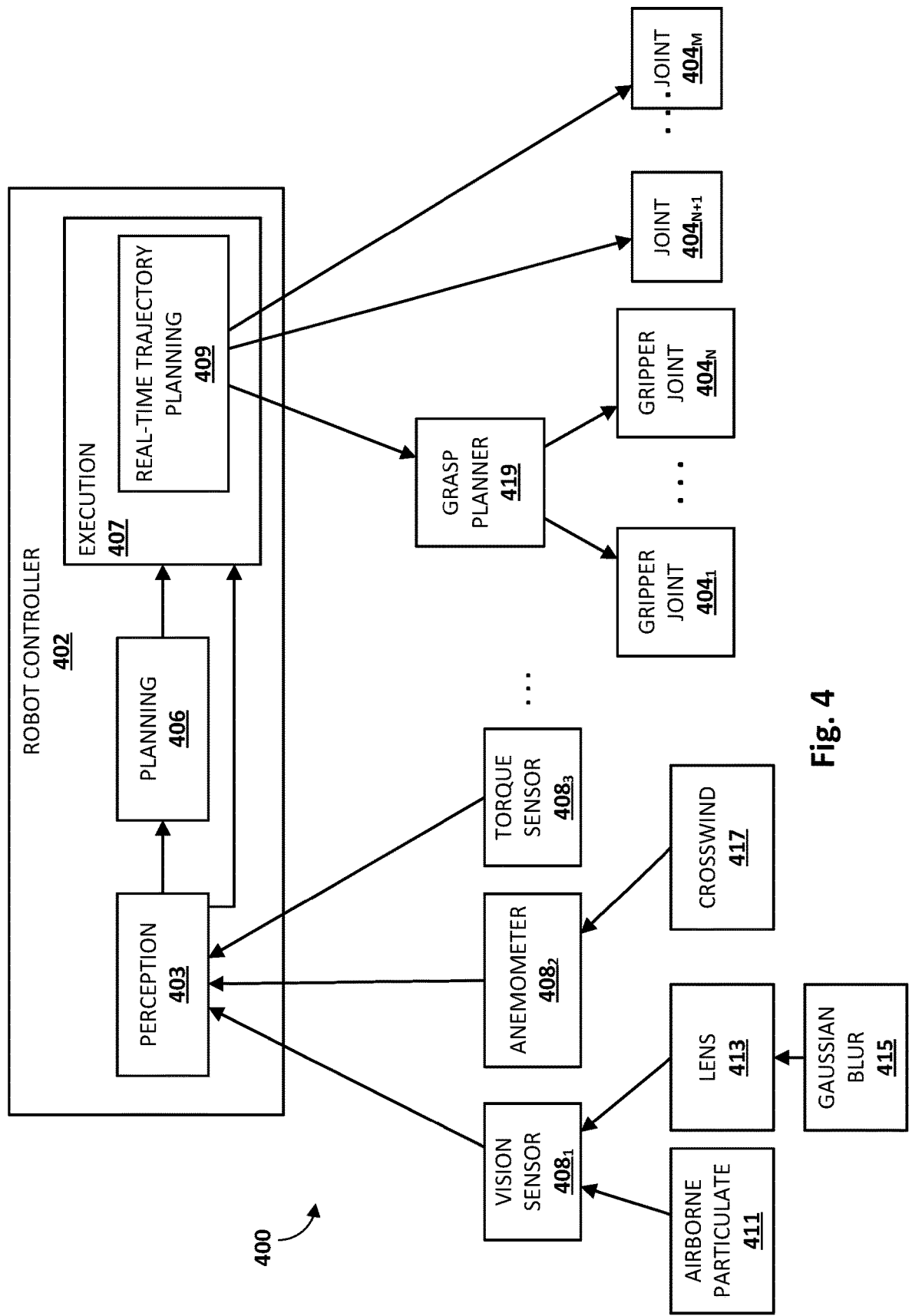
FIG. 4 depicts an example of an acyclic graph that may be used in various implementations to represent a robot and/or its constituent components.

Robot avatars and/or components related thereto may be generated and/or organized for use by simulation engine 136 in various ways. In some implementations, a graph engine 138 may be configured to represent robot avatars and/or their constituent components, and in some cases, other environmental factors, as nodes/edges of graphs. In some implementations, graph engine 138 may generate these graphs as acyclic directed graphs. In some cases these acyclic directed graphs may take the form of dependency graphs that define dependencies between various robot components. An example of such a graph is depicted in FIG. 4.

Representing robot avatars and other components as acyclic directed dependency graphs may provide a variety of technical benefits. One benefit is that robot avatars may in effect become portable in that their graphs can be transitioned from one virtual environment to another. As one non-limiting example, different rooms/areas of a building may be represented by distinct virtual environments. When a robot avatar "leaves" a first virtual environment corresponding to a first room of the building, e.g., by opening and entering a doorway to a second room, the robot avatar's graph may be transferred from the first virtual environment to a second virtual environment corresponding to the second room. In some such implementations, the graph may be updated to include nodes corresponding to environmental conditions and/or factors associated with the second room that may not be present in the first room (e.g., different temperatures, humidity, particulates in the area, etc.).

Another benefit is that components of robot avatars can be easily swapped out and/or reconfigured, e.g., for testing and/or training purposes. For example, to test two different light detection and ranging ("LIDAR") sensors on a real-world physical robot, it may be necessary to acquire the two LIDAR sensors, physically swap them out, update the robot's configuration/firmware, and/or perform various other tasks to sufficiently test the two different sensors. By contrast, using the graphs and the virtual environment techniques described herein, a LIDAR node of the robot avatar's graph that represents the first LIDAR sensor can simply be replaced with a node representing the second LIDAR sensor.

Yet another benefit is that various delays that occur between various robot components in the real world can be easily replicated using graphs. For example, one node representing a simulated sensor of a robot avatar may be configured to impose a delay on output of the sensor being passed up the directed acyclic graph. This delay may correspond to, for instance, a frequency of a real-world sensor corresponding to the simulated sensor. Nodes above the sensor's node may have to "wait" for the sensor output, even if they operate at higher frequencies, as would be the case with a real-world higher-frequency robot equipped with a lower frequency sensor.

Yet another benefit of using graphs as described herein is that outside influences on operation of real life robots may be represented as nodes and/or edges of the graph that can correspondingly influence operation of robot avatars in the virtual environment. In some implementations, one or more nodes of a directed acyclic graph may represent a simulated environmental condition of the virtual environment. These environmental condition nodes may be connected to sensor nodes so that the environmental conditions nodes may project or affect their environmental influence on the sensors corresponding to the connected sensor nodes. The sensor nodes in turn may detect this environmental influence and provide sensor data indicated thereof to higher nodes of the graph.

As one non-limiting example, a node coupled to (and therefore configured to influence) a vision sensor may represent particulate, smoke, or other visual obstructions that is present in an area. As another example, a node configured to simulate realistic cross wind patterns may be coupled to a wind sensor node of an unmanned aerial vehicle ("UAV") avatar to simulate cross winds that might influence flight of a real-world UAV. Additionally, in some implementations, a node coupled to a sensor node may represent a simulated condition of that sensor of the robot avatar. For example, a node connected to a vision sensor may simulate dirt and/or debris that has collected on a lens of the vision sensor, e.g., using Gaussian blur or other similar blurring techniques.

FIG. 1B depicts a non-limiting example of a robot 100 in the form of a robot arm. An end effector $106_1$ in the form of a gripper claw is removably attached to a sixth joint $104_6$ of robot 100. In this example, six joints $104_{1-6}$ are indicated. However, this is not meant to be limiting, and robots may have any number of joints. Robot 100 also includes a base 165, and is depicted in a particular selected configuration or "pose."

Figure 2:
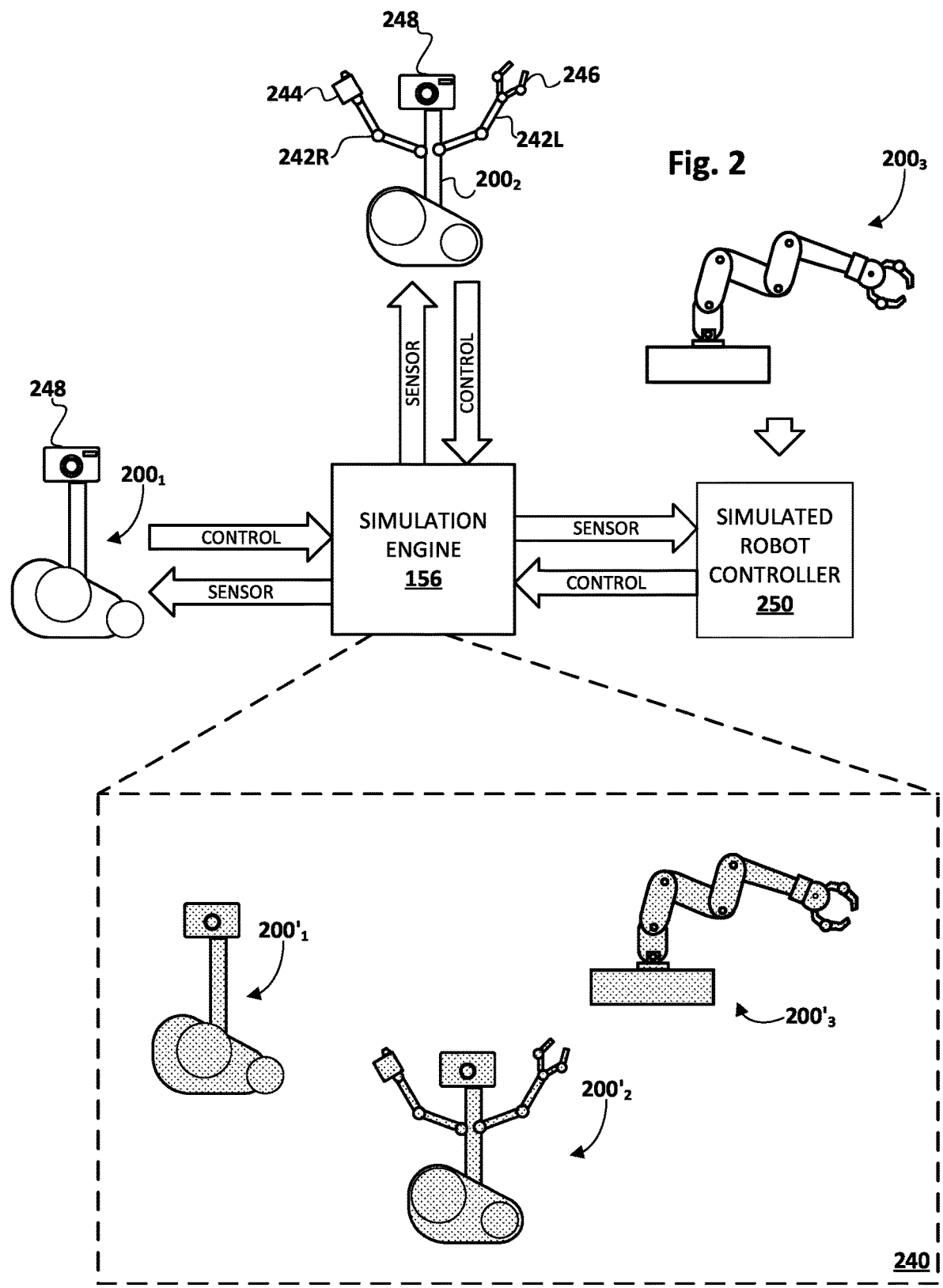
FIG. 2 schematically depicts an example of how robot controllers may interface with a simulation engine to facilitate generation of a virtual environment that includes robot avatars controlled by the robot controllers, in accordance with various implementations.

FIG. 2 schematically depicts one example of how simulation engine 136 may simulate operation of three different types of real-world robots $200_{1-3}$ as three corresponding robot avatars $200'_{1-3}$ in a virtual environment 240. The three real-world robots $200_{1-3}$ may take different forms from each other and may operate under different constraints and/or have different capabilities. While three robots/robot avatars are depicted in FIG. 2, any number of robots (or more particularly, robot controllers) may be coupled to and simulated within virtual environment 240 rendered by simulation engine 136.

In this example, a first robot $200_1$ takes the form of a telepresence robot that can move about an environment using one or more tracks, but that does not include any end effectors or tools. A second robot $200_2$ takes the form of a robot with two operable arms 242L and 242R. Operable arm 242L includes an end effector in the form of a sprayer 244, and operable arm 242R includes an end effector in the form of a gripper 246. Each of first and second robots $200_{1-2}$ includes a vision sensor 248. Third robot $200_3$ takes the form of a robot arm similar to robot 100 in FIGS. 1A-B.

Each of robots $200_{1-3}$ includes a respective robot controller, not depicted in FIG. 2, which may correspond to, for instance, logic 102 and memory 103 of robot 100 in FIG. 1A. In the real world (i.e., non-simulated environment), a robot controller may receive, e.g., from one or more sensors (e.g., $108_{1-M}$), sensor data that informs the robot controller about various aspects of the environment in which the robot operates. The robot controller may process the sensor data (perception) to make various determinations and/or decisions (planning), such as path planning, grasp selection, localization, mapping, etc. Many of these determinations and/or decisions may be made by the robot controller using one or more machine learning models. Based on these determinations/decisions, each robot controller may provide (execution) joint commands to various joint(s) (e.g., $104_{1-6}$ in FIG. 1B) to cause those joint(s) to be actuated.

When these robot controllers are coupled with virtual environment 240 simulated by simulation engine 136, the three robot avatars $200'_{1-3}$ may by operated by the robot controllers in a similar fashion. In many cases, the robot controllers may not even be "aware" they are "plugged into" virtual environment 240 at all, or that they are actually controlling virtual joints of robot avatars $200'_{1-3}$ in virtual environment 240, instead of real joints $104_{1-n}$.

However, instead of receiving real sensor data from real sensors (e.g., 108), simulation engine 136 may simulate sensor data within virtual environment 240, e.g., based on a perspective of each robot avatar 200' within virtual environment 240. As shown by the arrows in FIG. 2, this simulated sensor data may be injected by simulation engine 136 into a sensor data channel between one or more real-world sensors of each robot 200 and the robot controller that is integral with the robot 200. Thus, from the perspective of the robot controller, the simulated sensor data may not be distinguishable from real sensor data.

Additionally, and as shown by the arrows in FIG. 2, joint commands generated by the robot controllers based on this simulated sensor data are provided to simulation engine 136, which operates joints of robot avatars $200'_{1-3}$ instead of real robot joints. For example, the joint commands received from a given robot controller may be intercepted from a joint command channel between the robot controller and one or more joints of the given robot.

It is not necessary that a fully-functional robot be coupled with simulation engine 136 in order to simulate a corresponding robot avatar. In FIG. 2, for example, third robot $200_3$ is not coupled with simulation engine 136. Instead, a simulated robot controller 250 is configured to simulate inputs to (e.g., sensor data) and outputs from (e.g., joint commands) of third robot $200_3$. Simulated robot controller 250 may take various forms, such as a computing device with one or more processors and/or other hardware. Simulated robot controller 250 may be configured to provide inputs and receive outputs in a fashion that resembles, as closely as possible, an actual robot controller integral with third robot $200_3$. Thus, for example, simulated robot controller 250 may output joint commands at the same frequency as they are output by a real robot controller of third robot $200_3$. Similarly, simulated robot controller 250 may retrieve sensor data at the same frequency as real sensors of third robot $200_3$. Additionally or alternatively, in some implementations, aspects of a robot that form a robot controller, such as logic 102, memory 103, and/or various busses to/from joints/sensors, may be physically extracted from a robot and, as a standalone robot controller, may be coupled with simulation system 130.

Robots (e.g., $200_{1-3}$), standalone robot controllers, and/or simulated robot controllers (e.g., 250) may be coupled to or "plugged into" virtual environment 240 via simulation engine 136 using various communication technologies. If a particular robot controller or simulated robot controller is co-present with simulation system 130, it may be coupled with simulation engine 136 using one or more personal area networks (e.g., Bluetooth), various types of universal serial bus ("USB") technology, or other types of wired technology. If a particular robot controller (simulated, standalone, or integral with a robot) is remote from simulation system 130, the robot controller may be coupled with simulation engine 136 over one or more local area and/or wide area networks, such as the Internet. As will be discussed with regard to FIGS. 3A and 3B, with remote robot controllers, network interruptions and/or traffic may cause lag and/or other issues that may be addressed using various techniques described herein.

Different robots and/or robot components may operate at different frequencies. For example, one robot's vision sensor may generate vision sensor data at a frequency of 500 MHz. Even if the same robot's controller operates at 1 GHz, it may be limited by this lower frequency vision sensor. Another robot's controller may also operate a different frequency, such as 200 MHz. When these different-frequency robot controllers are plugged into virtual environment 240, simulation engine 136 may simulated their operational frequencies relative to each other to maintain some measure of verisimilitude, which is beneficial when generating training examples to train machine learning models.

In the real world, time advances uninterrupted while robots operate at their respective frequencies. If a particular robot becomes lagged, other robots continue to operate unabated. This makes reproducing robot task performances difficult, as it may not be possible or practical to recreate whatever phenomena caused the particular robot to lag. By contrast, in a simulated environment such as simulated environment 140, time may be paused as needed, e.g., to allow robots that are lagging for some reason to "catch up" to other robots. Consequently, it is easier to deterministically reproduce performance of robot tasks in virtual environment 240.

In some implementations, simulation engine 136 may operate a simulated world clock that can be advanced, paused, and even reversed as needed. In various implementations, the simulated world clock may be operated at a frequency that matches or exceeds the highest frequency robot that is simulated by a robot avatar in virtual environment 240.

Figure 3A:
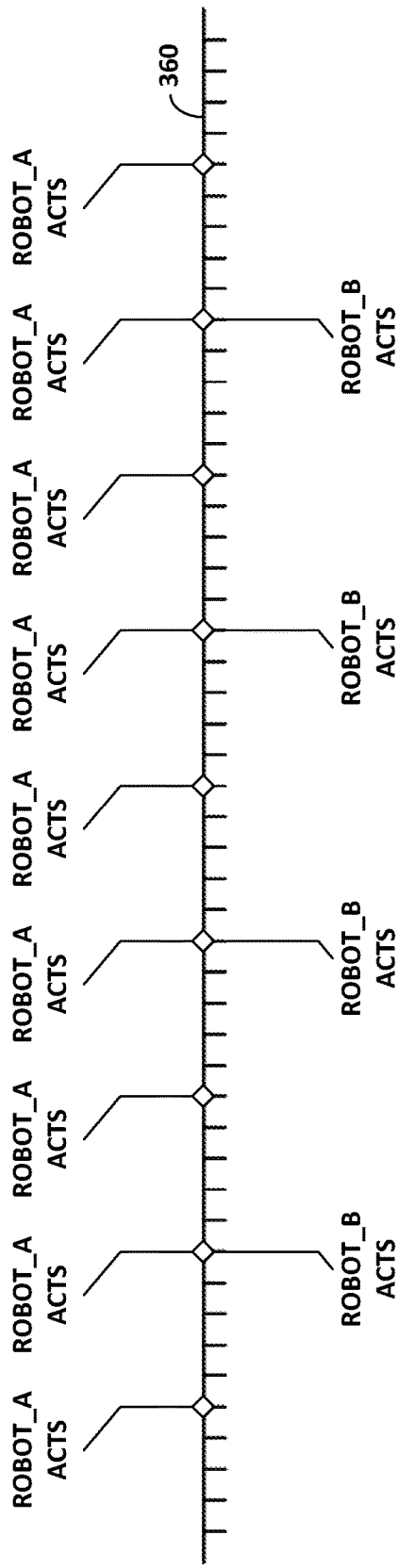
FIGS. 3A and 3B depict an example of how techniques described herein may be employed to generate deterministically-reproducible training instances, in accordance with various implementations.

FIG. 3A demonstrates how two different robot avatars (ROBOT_A and ROBOT_B) that correspond to two different real-world robots (not depicted) operating at different frequencies may be operated over time in a virtual environment, such as virtual environment 240. A timeline 360 that runs temporally from left to right includes tick marks that correspond to clock cycles of the simulated world clock. As seen in FIG. 3A, ROBOT_A performs an operation at a frequency of every five clock cycles. ROBOT_B operates at half the frequency of ROBOT_A, i.e. at a frequency of ten clock cycles. ROBOT_A and ROBOT_B are depicted as performing operations in synch with each other for the sake of simplicity, but this is not required.

Figure 3B:
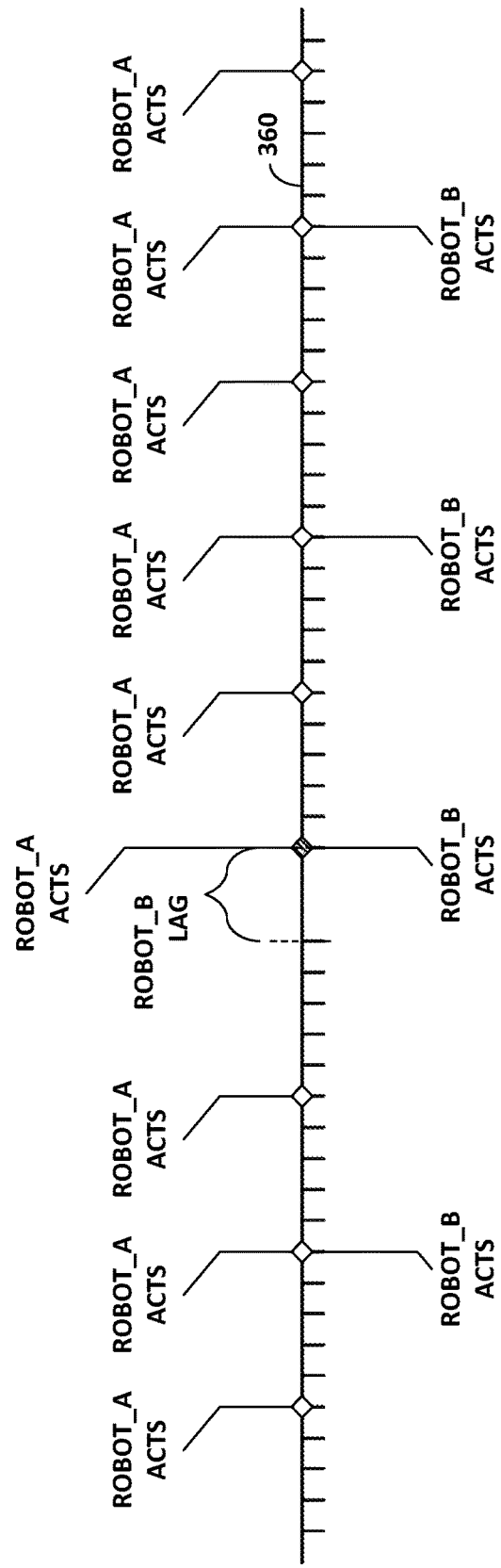

Assuming neither ROBOT_A nor ROBOT_B experiences any lag, e.g., due to heavy network traffic, network interruption, etc., both robot avatars may operate as shown in FIG. 3A. However, this might not always be the case. In FIG. 3B, for example, a similar timeline 360 is depicted. In FIG. 3B, ROBOT_A and ROBOT_B operate at their normal frequencies until the portion of timeline labeled as "ROBOT_B LAG," at which point ROBOT_B experiences a three-cycle lag. This lag may be caused by a variety of factors, such as the network issues mentioned previously, or due to the robot controller that controls ROBOT_B experiencing issues that cause lag, such as memory overload (e.g., caused by an entropy spike within virtual environment 240), processor overheating, interruption (e.g., scheduled software update), etc.

If the simulated world clock were to continue advancing unabated, ROBOT_A would continue to operate and would perform operations at the same clock cycles as it did in FIG. 3A. However, ROBOT_B might freeze temporarily. When ROBOT_B resumes, it might appear (e.g., from the perspective of ROBOT_A) that ROBOT_B and/or an object ROBOT_B acts upon has "jumped" or "warped" from one pose/position to another pose/position. In some cases, such as where ROBOT_A and ROBOT_B are cooperating to perform a task, this may cause issues for ROBOT_A and/or ROBOT_B. Even if ROBOT_A and ROBOT_B are not cooperating, and are performing unrelated tasks in different parts of virtual environment 240, this situation may be difficult or impossible to reproduce as a training example.

Accordingly, in various implementations, simulation engine 136 may be configured to pause a simulated world clock until a lagging robot avatar of a plurality of robot avatars is able to advance to a next stage of operation. In FIG. 3B, for instance, there are no tick marks in the time interval labeled "ROBOT_B LAG" because the simulated world clock has been paused. After what would have been three clock cycles, ROBOT_B is once again able to perform its operation. Consequently, at that point, or some point soon after (e.g., the next clock cycle), the simulated world clock may be resumed and ROBOT_A and ROBOT_B may resume their respective operations, as shown in FIG. 3B. Notably, when comparing the right halves of timeline 360 in FIG. 3A and FIG. 3B, the robot avatars in FIG. 3B act three clock cycles after the same actions in FIG. 3A.

FIG. 4 depicts an example acyclic directed graph 400 that may be generated, e.g., by graph engine 138 of simulation system 130, in accordance with various implementations. In this example, graph 400 takes the form of a dependency graph that includes nodes that represent constituent components of a robot (not depicted), environmental conditions, conditions of sensors, etc. The particular layout and arrangement of FIG. 4 is not meant to be limiting. Various components depicted in FIG. 4 may be arranged differently relatively to other components in other implementations. Moreover, only a few example components are depicted. Numerous other types of components are contemplated.

Graph 400 includes, as a root node, a robot controller 402 that is external to the virtual environment 240. In other implementations, the robot controller may not be represented as a node, and instead, a root node may act as an interface between the robot controller and children nodes (which may represent sensors and/or other robot controllers simulated in the virtual environment). Robot controller 402 may be implemented with various hardware and software, and may include components such as logic 102, memory 103, and in some cases, buss(es) from FIG. 1A. From a logical standpoint, robot controller 402 may include a perception module 403, a planning module 406, and an execution module 407. While shown as part of a root node in FIG. 4, in some implementations, one or more of these modules 403, 406, 407 may be represented as its own standalone node that is connected to other node(s) via edge(s). Modules 403, 406, and/or 407 may operate in part using machine learning models such as object recognition modules, models to aid in path planning, models to aid in grasp planning, etc. One or more of these machine learning models may be trained using training data that is generated by operating multiple robot avatars in a single virtual environment, as described herein.

Perception module 403 may receive sensor data from any number of sensors. In the real world, this sensor data may come from real life sensors of the robot in which robot controller 402 is integral. In virtual environment 240, this sensor data may be simulated by and propagated up from various sensor nodes $408_1, 408_2, 408_3, \ldots$ that represent virtual sensors simulated by simulation engine 136. For example, a vision sensor $408_1$ may provide simulated vision data, an anemometer $408_2$ may provide simulated data about wind speed, a torque sensor $408_3$ may provide simulated torque data captured at, for example, one or more robot joints 404, and so forth.

In some implementations, simulated environmental conditions may also be represented as nodes of graph 400. These environmental conditions may be propagated up from their respective nodes to the sensor(s) that would normally sense them in real life. For example, airborne particulate (e.g., smoke) that is desired to be simulated in virtual environment 240 may be represented by an airborne particulate node 411. In various implementations, aspects of the desired airborne particulate to simulate, such as its density, particle average size, etc., may be configured into node 411, e.g., by a user who defines node 411.

In some implementations, aside from being observed by a sensor, an environmental condition may affect a sensor. This is demonstrated by Gaussian blur node 415, which may be configured to simulate an effect of particulate debris collected on a lens of vision sensor $408_1$. To this end, in some implementations, the lens of vision senor $408_1$ may be represented by its own node 413. In some implementations, having a separate node for a sensor component such as a lens may enable that component to be swapped out and/or configured separately from other components of the sensor. For example, a different lens could be deployed on vision sensor node $408_1$ by simply replacing lens node 413 with a different lens node having, for instance, a different focal length. Instead of the arrangement depicted in FIG. 4, in some implementations, airborne particular node 411 may be a child node of lens node 413.

As another example of an environmental condition, suppose the robot represented by graph 400 is a UAV that is configured to, for instance, pickup and/or deliver packages. In some such implementations, a crosswind node 417 may be defined that simulates crosswinds that might be experienced, for instance, when the UAV is at a certain altitude, in a particular area, etc. By virtue of the crosswind node 417 being a child node of anemometer node $408_2$, the simulated cross winds may be propagated up, and detected by, the anemometer that is represented by node $408_2$.

Perception module 403 may be configured to gather sensor data from the various simulated sensors represented by nodes $408_1$, $408_2$, $408_3$, . . . during each iteration of robot controller 402 (which may occur at the robot controller's operational frequency relative to the simulated world clock described previously). Perception module 403 may then generate, for instance, a current state. Based on this current state, planning module 406 and/or execution module 407 may make various determinations and generate joint commands to cause joint(s) of the robot avatar represented by graph 400 to be actuated.

Planning module 406 may perform what is sometimes referred to as "offline" planning to define, at a high level, a series of waypoints along a path for one or more reference points of a robot to meet. Execution module 407 may generate joint commands, e.g., taking into account sensor data received during each iteration, that will cause robot avatar joints to be actuated to meet these waypoints (as closely as possible). For example, execution module 407 may include a real-time trajectory planning module 409 that takes into account the most recent sensor data to generate joint commands. These joint commands may be propagated to various simulated robot avatar joints $404_{1-M}$ to cause various types of joint actuation.

In some implementations, real-time trajectory planning module 409 may provide data such as object recognition and/or pose data to a grasp planner 419. Grasp planner 419 may then generate and provide, to gripper joints $404_{1-N}$, joint commands that cause a simulated robot gripper to take various actions, such as grasping, releasing, etc. In other implementations, grasp planner 419 may not be represented by its own node and may be incorporated into execution module 407. Additionally or alternatively, real-time trajectory planning module 409 may generate and provide, to other robot joints $404_{N+1 \text{ to } M}$, joint commands to cause those joints to actuate in various ways.

Figure 5:
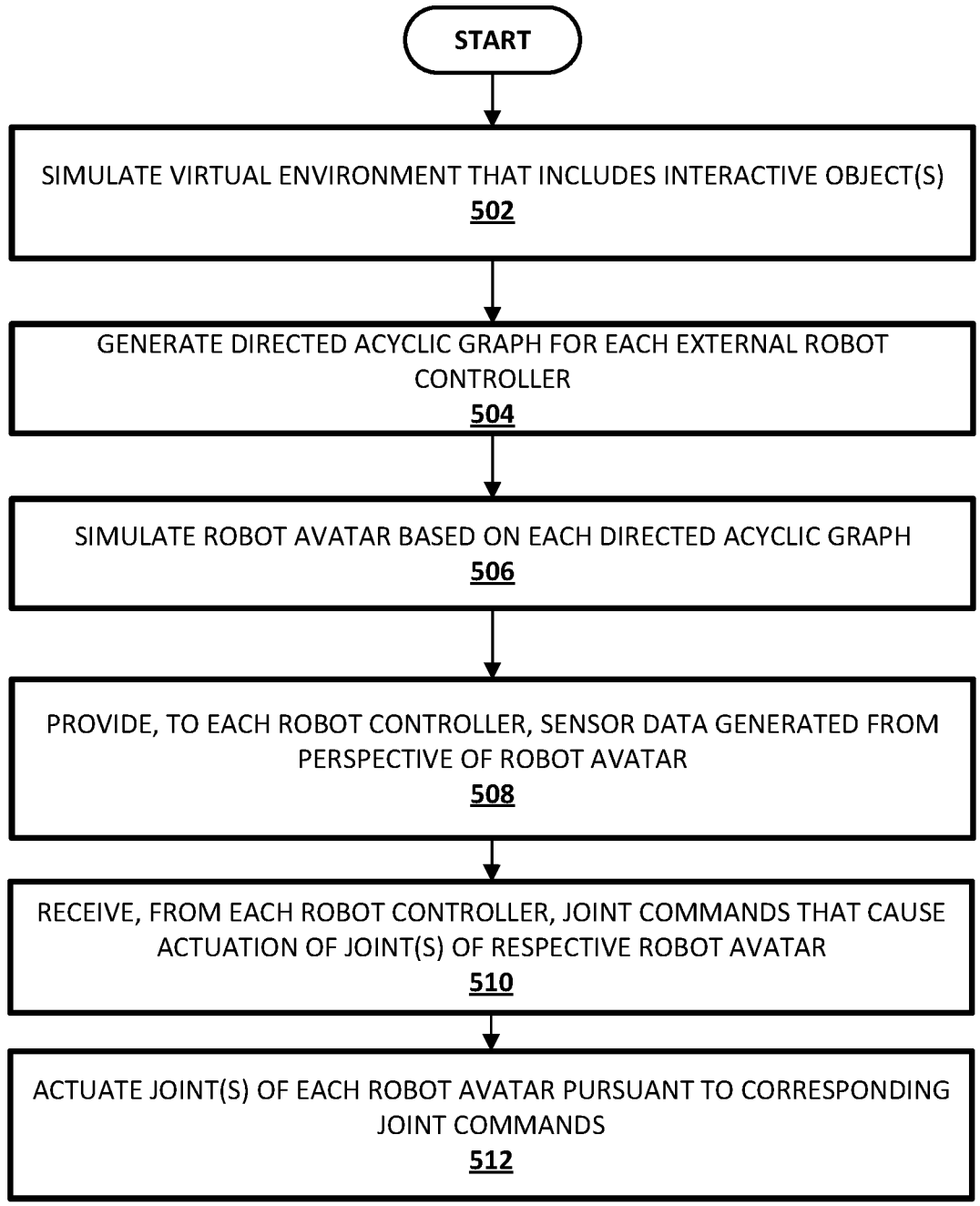
FIG. 5 depicts an example method for practicing selected aspects of the present disclosure.

Referring now to FIG. 5, an example method 500 of practicing selected aspects of the present disclosure is described. For convenience, the operations of the flowchart are described with reference to a system that performs the operations. This system may include various components of various computer systems. For instance, some operations may be performed at robot 100, while other operations may be performed by one or more components of simulation system 130. Moreover, while operations of method 500 are shown in a particular order, this is not meant to be limiting. One or more operations may be reordered, omitted or added.

At block 502, the system, e.g., by way of simulation engine 136, may simulate a three-dimensional virtual environment (e.g., 240) that includes one or more interactive objects. As noted previously and shown in FIG. 2, any number of external robot controllers (integral with robots, standalone, or simulated) may be plugged into the virtual environment. At block 504, the system, e.g., by way of graph engine 138, may generate a directed acyclic graph for each external robot controller that is plugged into the virtual environment. In some implementations, the system may poll the external robot controllers for information that can be used to generate the graph. In other implementations, the system may have a database of graphs that it can match to the robot controller.

At block 506, the system, e.g., by way of simulation engine 136 and based on the graphs generated at block 504, may simulate a plurality of robot avatars that are controlled independently and contemporaneously by the plurality of robot controllers that are external from the virtual environment. At block 508, the system may provide, to each robot controller of the plurality of robot controllers, sensor data that is generated from a perspective of the robot avatar that is controlled by the robot controller. At block 510, the system may receive, from each robot controller of the plurality of robot controllers, joint commands that cause actuation of one or more joints of the respective robot avatar that is controlled by the robot controller.

At block 512, the system may actuate one or more joints of each robot avatar pursuant to corresponding joint commands. In some implementations, the actuating causes two or more of the robot avatars to act upon the interactive object in the simulated environment. In various implementations, data generated as a result of the actuation of 512 may be used as training data to train one or more machine learning models employed by various components of a robot controller, such as perception module 403, planning module 406, and/or execution module 407. For example, a negative outcome may be used as a negative training example. A positive outcome may be used as a positive training example. In implementations in which reinforcement learning is employed, outcomes may be used to determine rewards, which can then be used to train the reinforcement learning policy.

Figure 6:
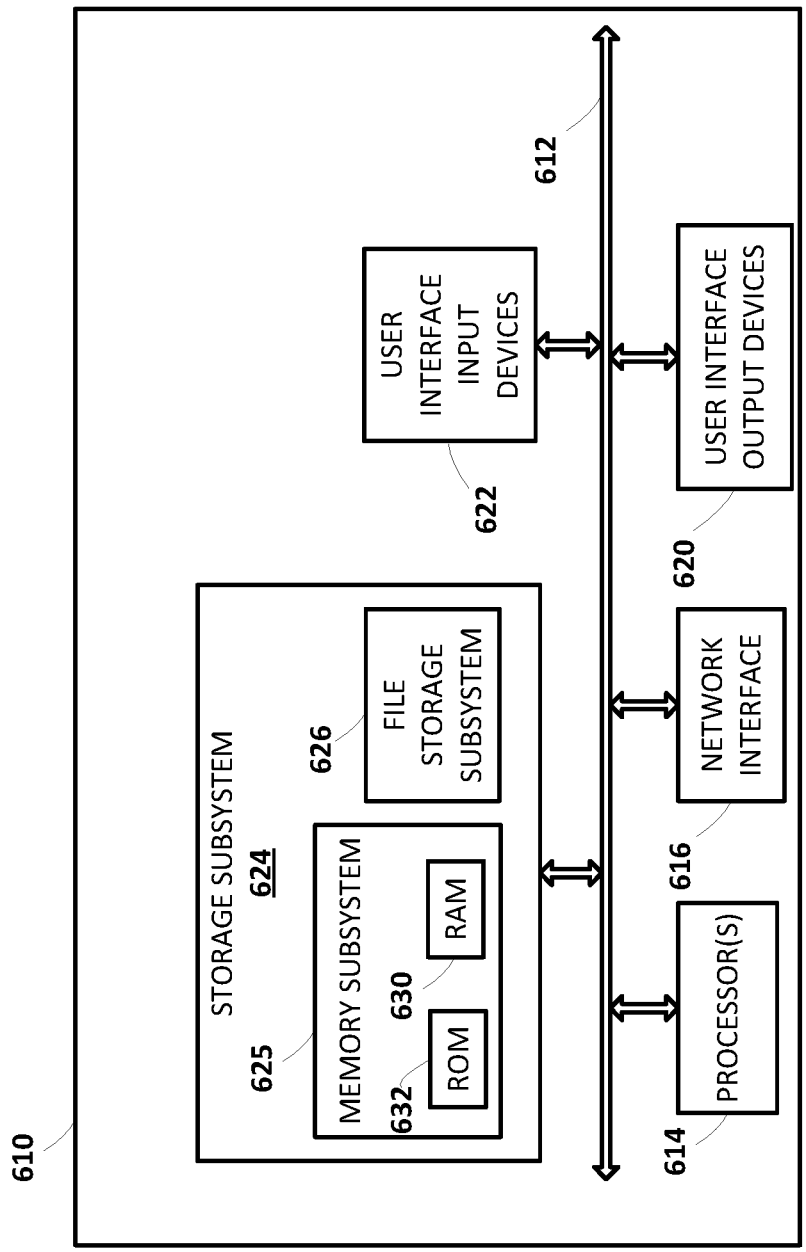
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of robot 100 or simulation system 130. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    simulating a three-dimensional virtual environment that includes an interactive object, wherein the virtual environment includes a plurality of robot avatars that are controlled independently and contemporaneously by a corresponding plurality of robot controllers that are integral with a plurality of physical robots that are external from the virtual environment and operably coupled with one or more of the processors, wherein the simulating includes generating, for each robot avatar of the plurality of robot avatars, a directed acyclic graph with nodes that represent joints or sensors of the robot avatar;
    providing, to each robot controller of the plurality of robot controllers, sensor data that is generated from a perspective of the respective robot avatar of the plurality of robot avatars that is controlled by the robot controller, wherein the sensor data provided to each robot controller is perceived by the robot controller as real-world sensor data;
    receiving, from each robot controller of the plurality of robot controllers, joint commands that cause actuation of one or more joints of the respective robot avatar of the plurality of robot avatars that is controlled by the robot controller; and
    actuating one or more joints of each robot avatar of the plurality of robot avatars pursuant to corresponding joint commands, wherein the actuating causes two or more of the plurality of robot avatars to act upon the interactive object in the virtual environment.

2. The method of claim 1, wherein the directed acyclic graph is a dependency graph in which edges between nodes represent dependencies between the joints or sensors represented by the nodes.

3. The method of claim 2, wherein at least one node representing a simulated sensor of the robot avatar imposes a delay on output of the sensor being passed up the directed acyclic graph, wherein the delay corresponds temporally to an operational frequency of a real-world sensor corresponding to the simulated sensor.

4. The method of claim 2, wherein one or more nodes of the directed acyclic graph represent a simulated environmental condition of the virtual environment.

5. The method of claim 2, wherein one or more nodes of the directed acyclic graph represent a simulated condition of a simulated sensor of the robot avatar.

6. The method of claim 1, wherein the actuating comprises operating the plurality of robot avatars at frequencies that correspond to real-world frequencies of the respective real-world robots in which the robot controllers that control the plurality of robot avatars are integral.

7. The method of claim 6, further comprising:
  operating a simulated world clock of the virtual environment at a given frequency that is greater than or equal to a highest frequency achievable by any of the plurality of robot controllers; and
  operating a first robot avatar of the plurality of robot avatars at a first frequency that is less than the given frequency.

8. The method of claim 6, further comprises pausing a simulated world clock until a robot avatar of the plurality of robot avatars advances to a next stage of operation.

9. A system comprising one or more processors and memory storing instructions that, in response to execution of the instructions by the one or more processors, cause the one or more processors to:
  simulate a three-dimensional virtual environment that includes an interactive object, wherein the virtual environment includes a plurality of robot avatars that are controlled independently and contemporaneously by a corresponding plurality of robot controllers that are integral with a plurality of physical robots that are external from the virtual environment and operably coupled with one or more of the processors, wherein the instructions to simulate include instructions to generate, for each robot avatar of the plurality of robot avatars, a directed acyclic graph with nodes that represent joints or sensors of the robot avatar;
  provide, to each robot controller of the plurality of robot controllers, sensor data that is generated from a perspective of the respective robot avatar of the plurality of robot avatars that is controlled by the robot controller, wherein the sensor data provided to each robot controller is perceived by the robot controller as real-world sensor data;
  receive, from each robot controller of the plurality of robot controllers, joint commands that cause actuation of one or more joints of the respective robot avatar of the plurality of robot avatars that is controlled by the robot controller; and
  actuate one or more joints of each robot avatar of the plurality of robot avatars pursuant to corresponding joint commands, wherein the actuating causes two or more of the plurality of robot avatars to act upon the interactive object in the virtual environment.

10. The system of claim 9, wherein the directed acyclic graph is a dependency graph in which edges between nodes represent dependencies between the joints or sensors represented by the nodes.

11. The system of claim 10, wherein at least one node representing a simulated sensor of the robot avatar imposes a delay on output of the sensor being passed up the directed acyclic graph, wherein the delay corresponds temporally to an operational frequency of a real-world sensor corresponding to the simulated sensor.

12. At least one non-transitory computer-readable medium comprising instructions that, in response to execution of the instructions by one or more processors, cause the one or more processors to perform the following operations:
  simulating a three-dimensional virtual environment that includes an interactive object, wherein the virtual environment includes a plurality of robot avatars that are controlled independently and contemporaneously by a corresponding plurality of robot controllers that are integral with a plurality of physical robots that are external from the virtual environment and operably coupled with one or more of the processors, wherein the instructions to simulate include instructions to generate, for each robot avatar of the plurality of robot avatars, a directed acyclic graph with nodes that represent joints or sensors of the robot avatar;
  providing, to each robot controller of the plurality of robot controllers, sensor data that is generated from a perspective of the respective robot avatar of the plurality of robot avatars that is controlled by the robot controller, wherein the sensor data provided to each robot controller is perceived by the robot controller as real-world sensor data;
  receiving, from each robot controller of the plurality of robot controllers, joint commands that cause actuation of one or more joints of the respective robot avatar of the plurality of robot avatars that is controlled by the robot controller; and
  actuating one or more joints of each robot avatar pursuant to corresponding joint commands, wherein the actuating causes two or more of the plurality of robot avatars to act upon the interactive object in the virtual environment.

* * * * *